US006326085B1

(12) United States Patent
McAneney et al.

(10) Patent No.: US 6,326,085 B1
(45) Date of Patent: Dec. 4, 2001

(54) COATED PHOTOGRAPHIC PAPERS

(75) Inventors: T. Brian McAneney, Burlington; Edward G. Zwartz, Mississauga; Kirit N. Naik, Mississauga; Fernando P. Yulo, Mississauga; Sandra J. Gardner, Oakville; James H. Sharp, Burlington; Shadi L. Malhotra, Mississauga, all of (CA)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/706,887

(22) Filed: Nov. 2, 2000

Related U.S. Application Data

(62) Division of application No. 09/041,353, filed on Mar. 12, 1998, now Pat. No. 6,177,222.

(51) Int. Cl.[7] ...................... B32B 27/06

(52) U.S. Cl. ...................... 428/480; 428/481; 430/124

(58) Field of Search ...................... 428/480, 481; 430/124

(56) References Cited

U.S. PATENT DOCUMENTS

| | | | | |
|---|---|---|---|---|
| 3,467,634 | | 9/1969 | Jacknow et al. | 430/126 |
| 3,526,533 | | 9/1970 | Jacknow et al. | 430/108 |
| 3,590,000 | | 6/1971 | Palermiti et al. | 430/110 |
| 3,800,588 | | 4/1974 | Larson et al. . | |
| 3,847,604 | | 11/1974 | Hagenbach et al. | 430/108 |
| 4,337,303 | | 6/1982 | Sahyun et al. | 430/126 |
| 4,510,225 | | 4/1985 | Kuehnle et al. | 430/124 |
| 4,529,650 | | 7/1985 | Martinez | 430/124 |
| 4,558,108 | | 12/1985 | Alexandru et al. | 526/340 |
| 4,663,216 | | 5/1987 | Toyoda et al. | 428/212 |
| 4,692,636 | | 9/1987 | Wang | 307/427 |
| 4,705,719 | | 11/1987 | Yamanaka et al. | 428/323 |
| 4,868,581 | | 9/1989 | Mouri et al. | 346/135.1 |
| 4,903,039 | | 2/1990 | Light | 346/135.1 |
| 4,903,040 | | 2/1990 | Light | 346/135.1 |
| 4,903,041 | | 2/1990 | Light | 346/135.1 |
| 4,927,495 | | 5/1990 | Tamagawa | 162/135 |
| 4,935,326 | | 6/1990 | Creatura et al. | 430/108 |
| 4,937,166 | | 6/1990 | Creatura et al. | 430/108 |
| 5,037,718 | | 8/1991 | Light et al. | 430/126 |
| 5,043,242 | * | 8/1991 | Light et al. | 430/126 |
| 5,102,768 | | 4/1992 | Light et al. | 430/126 |
| 5,132,198 | | 7/1992 | Tamary | 430/124 |
| 5,229,242 | | 7/1993 | Mahabadi et al. | 430/106.6 |
| 5,308,733 | | 5/1994 | Rimai et al. | 430/126 |
| 5,358,820 | | 10/1994 | Bugner et al. | 430/126 |
| 5,451,458 | | 9/1995 | Malhotra | 428/412 |
| 5,534,479 | | 7/1996 | Shuttleworth et al. | 503/227 |
| 5,627,128 | | 5/1997 | Bowman et al. | 503/227 |
| 5,665,504 | | 9/1997 | Malhotra | 430/97 |
| 5,693,437 | | 12/1997 | Malhotra | 430/18 |
| 5,714,287 | | 2/1998 | Malhotra | 430/47 |
| 5,948,534 | * | 9/1999 | Altavilla | 428/423.7 |
| 6,177,222 | * | 1/2001 | McAneney et al. | 430/124 |

FOREIGN PATENT DOCUMENTS

| | | |
|---|---|---|
| 0 711 672 A2 | 5/1996 | (EP) . |
| 0 711 672 A3 | 11/1996 | (EP) . |
| 0 877 298 A2 | 11/1998 | (EP) . |
| 0 877 298 A3 | 11/1998 | (EP) . |
| 1442835 | 7/1976 | (GB) . |
| 05104868 | 4/1993 | (JP) . |

* cited by examiner

*Primary Examiner*—Mark Chapman
(74) *Attorney, Agent, or Firm*—Oliff & Berridge, PLC

(57) ABSTRACT

A process which comprises forming an image on a substrate, and developing the image with toner, and wherein the substrate contains a coating of a polyester and there is enabled images of high uniform gloss.

40 Claims, No Drawings

COATED PHOTOGRAPHIC PAPERS

This is a Division of application Ser. No. 09/041,353 filed Mar. 12, 1998, now U.S. Pat. No. 6,177,222 . The entire disclosure of the prior application(s) is hereby incorporated by reference herein in its entirety.

BACKGROUND OF THE INVENTION

The present invention is directed to papers, and more specifically, to papers for electrography, such as xerographic compatible photographic papers, that is for example coated papers containing a supporting substrate derived from, for example, natural cellulose and having the appearance of a photographic base paper with certain coatings thereover and thereunder, and the use of these papers in imaging, especially xerographic processes and digital imaging processes, and wherein uniform high gloss images can be obtained. More specifically, the present invention is directed to processes for achieving gloss uniformity of xerographic prints and which gloss is similar or equivalent to silver halide glossy prints or high quality glossy offset prints in color intensity and gloss uniformity with coated papers to which has been applied a substantially clear coating of a polyester resin, such as a low melt branched polyester, like the known SPAR polyesters, reference U.S. Pat. No. 3,590,000, the disclosure of which is totally incorporated herein by reference. The thin, for example from about 1 to about 10 microns, and preferably about 7 microns, or other suitable thickness, coating, especially the polyester coating, absorbs the fused toner particles thereby resulting in a smooth surface and high uniform gloss, and which gloss is less dependent on the degree of toner coverage. In embodiments, the coated photographic papers are capable of recording clear, brilliant, glossy images of high optical density, and with lightfastness values of greater than about 98 percent, and more specifically, from about 98 to about 100 percent for dry colored, such as pigmented toners, waterfastness values of about 100 percent and comparable in look and feel to conventional color photographic camera prints.

PRIOR ART

Certain polyester coated papers are known, reference for example U.S. Pat. Nos. 5,627,128; 5,534,479 and 4,692,636.

There is disclosed in U.S. Pat. No. 4,663,216 a synthetic paper comprised of (1) a multilayer support, (2) a layer of a transparent film of a thermophotographic resin free from an inorganic fine powder formed on one surface of the support (1), and (3 ) a primer layer of a specific material, reference the Abstract of the Disclosure for example. The support (1) comprises (1a) a base layer of a biaxially stretched film of a thermophotographic resin, a surface and a back layer (1b), and (1c) composed of a monoaxially stretched film of a thermophotographic resin containing 8 to 65 percent by weight of an inorganic fine powder.

Further, there is disclosed in U.S. Pat. No. 4,705,719 a synthetic paper of multilayer resin film comprising a base layer (1a) of a biaxially stretched thermophotographic resin film, and a laminate provided on at least one of opposite surfaces of the base layer, the laminate including a paper-line layer (1b) and a surface layer (1c), the paper like layer containing a uniaxially stretched film of thermophotographic resin containing 8 to 65 percent by weight of inorganic fine powder, and wherein the surface layer contains an uniaxially stretched film of a thermophotographic resin.

In U.S. Pat. No. 4,868,581, there is disclosed an opaque paper-based receiving material for ink jet printing which comprises a poly(olefin)-coated paper overcoated with an ink-receiving layer which contains a mixture of gelatin and starch. Reportedly, these receiving materials exhibit gloss, good color density and are smudge resistant. Although such receiving materials, when pictorially imaged with an ink jet printing device, may enable images acceptable in appearance and feel, the images thereon are still not believed to be of the same high quality that is customarily expected from and exhibited by photographic prints.

Also, that is disclosed in U.S. Pat. No. 4,903,039 an opaque paper-based receiving material for ink jet printing, which papers comprise a poly(olefin)-coated paper overcoated with an ink-receiving layer which contains an aqueous dispersion of a polyester ionomer, namely a poly [cyclohexylenedimethylene-co-oxydiethylene isophthalate-co-malonate-co-sodiosulfo benzenedicarboxylate], dispersed in vinyl pyrrolidone polymer.

Further, there is disclosed in U.S. Pat. No. 4,903,040 an opaque paper-based receiving material for ink jet printing which comprises a poly(olefin)-coated paper overcoated with an ink-receiving layer which contains an aqueous dispersion of a polyester ionomer, namely a poly [cyclohexylenedimethylene isophthalate-co-sodiolsulfobenzene dicarboxylate], dispersed in vinyl pyrrolidone polymer.

Moreover, there is disclosed in U.S. Pat. No. 4,903,041 an opaque paper-based receiving material for ink jet printing which comprises a poly(olefin)-coated paper overcoated with an ink-receiving layer which contains an aqueous dispersion of a polyester ionomer, namely a poly [cyclohexylenedimethylene-co-xylyleneterephthalate-co-malonate-co-sodioiminobis(sulfonylbenzoate], dispersed in vinyl pyrrolidone polymer.

U.S. Pat. No. 5,451,458, the disclosure of which is totally incorporated herein by reference, discloses a recording sheet which comprises (a) a substrate; (b) a coating on the substrate which comprises (1) a binder selected from the group consisting of (A) polyesters; (B) polyvinyl acetals; (C) vinyl alcohol-vinyl acetal copolymers; (D) polycarbonates; and (E) mixtures thereof; and (2) an additive having a melting point of less than about 65° C. and a boiling point of more than about 150° C. and including, for example, furan derivatives; and developing the latent image with a toner which comprises a colorant and a resin selected from the group consisting of (A) polyesters; (B) polyvinyl acetals; (C) vinyl alcohol-vinyl acetal copolymers; (D) polycarbonates; and (E) mixtures thereof; and (3) transferring the developed image to a recording sheet which compresses (a) a substrate; (b) a coating on the substrate which comprises (1) a binder selected from the group consisting of (A) polyesters; (B) polyvinyl acetals; (C) vinyl alcohol-vinyl acetal copolymers: (D) polycarbonates; and (E) mixtures thereof.

While the above materials and processes may be suitable for their intended purposes, a need remains for photographic papers particularly suitable for use in electrophotographic applications. In addition, a need remains for photographic papers which can be employed with xerographic dry toners so that the heat and energy required for properly fusing the toner to the photographic paper is reduced by about 14 percent allowing the toner to be fused, for example, at 150° C. instead of the conventional about 175° C. Further, a need remains for photographic papers which can be employed with xerographic toners, and wherein jamming of telephotographic papers in the fusing apparatus is reduced. Additionally, there is a need for photographic papers suitable for use in electrophotographic applications with reduced energy demands, by about 14 percent, allowing the toner to be fused at 150° C. instead of the usual in some instances of about 175 to about 180° C., and reduced jamming, and wherein the photographs also exhibit acceptable image quality, excellent image fix to the paper, and more importantly, high uniform gloss similar to silver halide prints which typically have perfectly uniform high gloss levels of about 70 GU to about 100 GU as measured by a 75° Glossmeter.

SUMMARY OF THE INVENTION

It is a feature of the present invention to provide photographic papers with many of the advantages indicated herein.

It is another feature of the present invention to provide photographic papers, inclusive of xerographic photopapers particularly suitable for use in electrophotographic imaging systems; and also wherein there are enabled developed images with uniform gloss, and wherein, for example, the coating on the paper, such as the polyester illustrated herein, absorbs the fused toner particles thereby resulting in a smooth image surface.

It is yet another feature of the present invention to provide photographic papers which can be employed with xerographic dry toners, and wherein the heat and energy required for fusing the toner to the photographic paper is reduced, and wherein there are obtained images with uniform gloss throughout the visible image and which gloss in equivalent to, or similar to silver halide prints.

It is still another feature of the present invention to provide photographic papers which can be selected with xerographic dry toners, and wherein jamming of the photographic papers in the fusing apparatus is minimized.

Another feature of the present invention is to provide photographic papers suitable for use in electrophotographic, especially xerographic, imaging methods with reduced fusing energy requirements and reduced jamming, wherein the photographs also exhibit acceptable image quality, excellent image fix to the photographic papers, and superior gloss.

The present invention relates to a coated photographic paper comprised of (1) a substrate, such as a cellulosic substrate, and a coating thereover of a polyester or similar polymer and which coating is preferably thin, for example about 1 to about 15, or from about 5 to about 10 microns, as measured by a thickness gauge, model MT-12 from Heidenhain, and wherein there is enabled uniform glossy images with such papers. More specifically, there are provided in accordance with the present invention processes for generating high, for example, from about 50 to about 100 gloss units as measured with a 75° Glossmeter, Glossgard from Pacific Scientific, and which gloss is uniform, that it does not significantly vary, or change on the image, or wherein the differential gloss level is reduced or minimized, that is for example, a gloss variance of about 40 GU to about 80 GU is avoided with the invention polyester coated papers. By uniform gloss is meant, for example, a gloss variation of between about 20 GU to about 10 GU and preferably a gloss variation of between about 10 GU to about 0 GU.

Aspects of the present invention relate to a process which comprises forming an image on a substrate, and developing the image with toner, and wherein the substrate contains a coating of a polyester and there is enabled images of uniform gloss; a process wherein the polyester coating is of a thickness of about 1 to about 15 microns; a process wherein the polyester coating is of a thickness of about 7 microns; a process wherein the polyester coating is a poly(propoxylated bisphenol A fumarate) resin, a polyester resin of a terephthalic acid, bisphenol-A-ethylene oxide adduct, cyclohexane dimethanol or a low, from about 1,000 to about 50,000 $M_W$, molecular weight, branched copolyester formed from isophthalic and nonanedioic acids with diols and triols; a process wherein the gloss value is high, and wherein said high is between about 50 GU to about 100 GU as measured by a 75° Glossmeter; a process wherein the gloss value is high, and wherein said high is between about 80 GU to about 100 GU as measured by a 75° Glossmeter, and which gloss is the same or similar throughout the entire developed image; a process wherein the substrate is of a thickness of from about 80 microns to about 200 microns; a process wherein the uniform high gloss resides in substantially no gloss difference in the range of gloss of 70 GU to 100 GU, and wherein said gloss is equivalent to or similar to silver halide prints; a process wherein the substrate is a cellulosic substrate and is comprised of alkaline sized and acid sized blends of hardwood kraft and softwood kraft fibers, which blends contain from about 10 percent to about 90 percent by weight of softwood and from about 90 to about 10 percent by weight of hardwood; a process wherein the sizing value of the cellulosic substrate is from about 200 seconds and about 1,100 seconds, the porosity is from about 50 to about 300 mil/minute, and the thickness is from about 50 microns and about 250 microns; an imaging process which comprises (1) generating an electrostatic latent image on an imaging member in an imaging apparatus; (2) developing the latent image with a toner comprised of a colorant and a resin, such as a known thermoplastic resin, and more specifically, binder resin selected from the group consisting of (A) polyesters, (B) styrene-butadiene copolymers, (C) styrene-acrylate copolymers, and (D) styrene-methacrylate copolymers; (3) transferring the developed image to a coated paper and wherein the coating is a polyester; and (4) fixing the image onto the paper with heat and pressure; an imaging process wherein the images resulting on a polyester coated substrate, such as paper possess an optical density between about 1.45 to about 1.56 for a black toner, between about 1.35 to about 1.40 for a cyan toner, between about 1.23 to about 1.30 for a magenta toner, and between about 0.87 to about 0.89 for a yellow toner; an imaging process wherein the colorant is a pigment and the resin is a polyester; an imaging process wherein the colorant is a dye; a process which comprises forming an image on a coated substrate, and developing the image with a toner, and wherein the substrate contains a polymer coating and there is enabled images of a high uniform gloss; a process wherein the coating is a polyester; a process wherein the substrate is paper or coated reproduction paper having a thickness in the range of about 80 microns to about 200 microns; a process wherein the toner is comprised of resin and colorant; a process wherein the resin is a polyester of poly(propoxylated bisphenol A fumarate), a polyester resin comprised of terephthalic acid/biphenol A ethylene adduct/cyclohexane dimethanol or low molecular weight, branched copolyesters formed from isophthalic and nonanedioic acids with diols and triols; a process wherein the toner is comprised of resin and colorant; a photopaper comprised of a substrate and a thin coating thereover, and wherein said thin coating is from about 1 to about 20 microns, and wherein a photopaper is selected for the generation of images with a uniform gloss; a photopaper wherein said coating is a polyester wherein said images are developed with a toner of resin and colorant, and wherein said polyester possesses a lower melt viscosity than the toner resin at the temperature used to fuse said images, and wherein the melt viscosity of the polyester coating is from about 500 poise to about 1,000 poise, and the melt viscosity of the toner resin is from about 4,000 poise to about 5,000 poise; a process wherein the gloss variation is between about 20 GU to about 10 GU, or the gloss variation is between about 10 GU to about 0 GU as measured by a 75° Glossmeter; a process wherein the gloss variation is between about 10 GU to about 0 GU as measured by a 75° Glossmeter; a process wherein the toner image is absorbed into the substrate coating during the fusing process; a process which comprises forming an image on a substrate, and developing the image with toner, and wherein the substrate contains a coating of a polyester; an imaging process which comprises (1) generating an electrostatic latent image on an imaging member in an imaging apparatus; (2) developing the latent image with a toner which comprises a colorant and a resin; (3) transferring the developed image to a polyester coated substrate; and (4) fixing the image onto the paper with heat and pressure; and a process wherein polyester diols are 2,2,4,4-tetraalkyl-1,3-cyclobutane diol, 1,4-butane diol, or 1,3-propane diol; and wherein the triols are 2-(hydroxy methyl)1,3-propane diol, 1,1,1(trishydroxy methyl) ethane, 1,2,4-butane triol, or 1,2,3-propane triol.

The substrates selected are primarily coated papers comprised of a photopaper of a base sheet and commercially available as ink jet, off set or xerographic papers, and wherein there is applied to the paper by solvent coating thereof a polymer, preferably a polyester, and wherein there is selected a dry toner for development, and more specifically, a toner containing a polyester resin. The coating, such as the polyester, applied to the paper preferably possesses a lower melt viscosity at the image fusing temperature of, for example, about 140° C. to about 170° C. than the toner resin, especially toner polyester resin. By lower melt viscosity is meant, for example, a viscosity of, for example, about 500 poise to about 1,000 poise and preferably about 500 poise to about 700 poise as measured by a Rheometrics Dynamic Mechanical Spectrometer. The coated substrate, such as paper, is more specifically comprised of a coated reproduction paper where the manufacturer's coating is believed to comprise from about 70 percent by weight to about 90 percent by weight of a pigment, such as Kaolin clay, calcined clays, calcium carbonate, titanium dioxide, talc or alumina trihydrate, and about 5 to about 30 weight percent of a binder, such as starch, poly(vinyl alcohol), styrene-butadiene, polyacrylate or poly(vinyl acetate). These coated reproduction papers are available from paper manufacturers, such as the Champion Paper Company, Consolidated Papers Inc., Asahi Glass Company and Schoeller Papers Inc. Suitable coated reproduction papers have thicknesses ranging from, for example, about 80 microns to about 200 microns. The coating, such as preferably the polyester coating, is more specifically comprised of a poly(propoxylated bisphenol A fumarate) resin, a polyester resin comprised of poly(terephthalic acid bisphenol-A-ethylene oxide adduct), cyclohexane dimethanol or a low, for example from about 1,000 to about 50,000, and preferably about 20,000 $M_W$ molecular weight, branched copolyester formed from isophthalic and nonanedioic acids with diols and triols, such as resin, is Vitel 5833B polyester available from the Bostik Company. Other suitable coatings may be selected, such as known polyester, inclusive of the polyester of, for example, U.S. Pat. No. 3,590,000.

Any suitable substrate can be employed; for example, the substrate can be comprised of sized blends of hardwood kraft and softwood kraft fibers, which blends contain from about 10 percent to about 90 percent by weight of softwood and from about 90 to about 10 percent by weight of hardwood. Examples of hardwood include Seagull W dry bleached hardwood kraft preferably present, for example, in one embodiment in an amount of about 70 percent by weight. Examples of softwood include La Toque dry bleached softwood kraft present, for example, in one embodiment in an amount of 30 percent by weight. These sized substrates may also contain pigments in effective amounts of from about 1 to 60, and preferably from about 1 to about 25 percent by weight, such as clay (available from Georgia Kaolin Company, Astro-fil 90 clay, Engelhard Ansilex clay), titanium dioxide (available from Tioxide Company—Anatase grade AHR), calcium silicate CH-427-97-8, XP-974 (J. M. Huber Corporation), and the like. Also, the sized substrates may contain various effective amounts of sizing chemicals (for example from about 0.25 percent to about 25 percent by weight of pulp), such as Mon size (available from Monsanto Company), Hercon-76 (available from Hercules Company), Alum (available from Allied Chemicals as iron free alum), and retention aid (available from Allied Colloids as Percol 292). The sizing values of papers, including the commercial papers that can be selected for the present invention in embodiments thereof, vary between , for example, about 0.4 second to about 4,685 seconds, and papers in the sizing range of about 50 seconds to about 300 seconds are preferred, primarily to decrease costs. The porosity values of the substrates, which are preferably porous, vary from about 100 to about 1,260 mil/minute and preferably from about 100 to about 600 mil/minute to permit, for example, the use of these papers for various printing technologies, such as thermal transfer, liquid toner development, xerography, ink jet processes, and the like.

Illustrative examples of commercially available, internally and externally (surface) sized substrates that may be selected for the present invention, and which are treated with a desizing agent dispersed in an optional binder with a substrate thickness of, for example, from about 50 microns to about 200 microns and preferably of a thickness of from about 100 microns to about 175 microns include Diazo papers, offset papers such as Great Lakes offset, recycled papers such as Conservatree, office papers such as Automimeo, Eddy liquid toner paper and copy papers from companies such as Nekoosa, Champion, Wiggins Teape, Kymmene, Modo, Domtar, Veitsiluoto and Sanyo with Xerox 4024™ papers and sized calcium silicate-clay filled papers being particularly preferred in view of their availability, and low print through.

The Hercules size values recited herein were measured on the Hercules sizing tester (available from Hercules Incorporated) as described in TAPPI STANDARD T-530 pm-83, issued by the Technical Association of the Pulp and Paper Industry. This method is closely related to the widely used ink flotation test. The TAPPI method has the advantage over the ink flotation test of detecting the end point photometrically. The TAPPI method employs a mildly acidic aqueous dye solution as the penetrating component to permit optical detection of the liquid front as it moves through the paper sheet. The apparatus determines the time required for the reflectance of the sheet surface not in contact with the penetrant to drop to a predetermined (80 percent) percentage of its original reflectance.

The coated xerographic photographic papers of the present invention exhibit reduced curl upon being printed with toners. Generally, the term "curl" refers to the distance between the base line of the arc formed by recording sheet when viewed in cross-section across its width (or shorter dimension, for example 8.5 inches in an 8.5 by 11 inch sheet, as opposed to length, or longer dimension, for example 11 inches in an 8.5 by 11 inch sheet) and the midpoint of the arc. To measure curl, a sheet can be held with the thumb and forefinger in the middle of one of the long edges of the sheet (for example, in the middle of one of the 11 inch edges in an 8.5 by 11 inch sheet) and the arc formed by the sheet can be matched against a pre-drawn standard template curve.

The lightfastness values of the xerographic images were measured in the Mark-V Lightfastness Tester obtained from Microscal Company, London, England.

The gloss values recited herein were obtained on a 75° Glossmeter, Glossgard, from Pacific Scientific (Gardner/Neotec Instrument Division). The edge raggedness values were measured using an Olympus microscope equipped with a camera capable of enlarging the recorded xerographic images. The edge raggedness value is the distance in millimeters for the intercolor bleed on a checkerboard pattern.

The optical density measurements recited herein were obtained on a Pacific Spectrograph Color System. The system consists of two major components, an optical sensor and a data terminal. The optical sensor employs a 6 inch integrating sphere to provide diffuse illumination and 2 degrees viewing. This sensor can be used to measure both transmission and reflectance samples. When reflectance samples are measured, a specular component may be included. A high resolution, full dispersion, grating monochromator was used to scan the spectrum from 380 to 720 nanometers. The data terminal features a 12 inch CRT display, numerical keyboard for selection of operating parameters, and the entry of tristimulus values, and an alphanumeric keyboard for entry of product standard information. The print through value as characterized by the printing industry is Log base 10 (reflectance of a single sheet of unprinted paper against a black background/reflectance of the back side of a black printed area against a black background) measured at a wavelength of 560 nanometers.

A number of different toners can be selected. Illustrative examples of suitable toner binders are, for example, resins such as polyesters, polyamides, polyolefins, styrene acrylates, styrene methacrylate, styrene butadienes, crosslinked styrene polymers, epoxies, polyurethanes, vinyl resins, including homopolymers or copolymers or two or more vinyl monomers; and polymeric esterification products of a dicarboxylic acid and a diol comprising a diphenol. Vinyl monomers include styrene, p-chlorostyrene, unsaturated mono-olefins such as ethylene, propylene, butylene, isobutylene and the like; saturated mono-olefins such as vinyl acetate, vinyl propionate, and vinyl butyrate; vinyl esters like esters of monocarboxylic acids including methyl acrylate, ethyl acrylate, n-butylacrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; mixtures thereof; and the like, styrene butadiene copolymers with a styrene content of from about 70 to about 95 weight percent. In addition, crosslinked resins, including polymers, copolymers, homopolymers of the aforementioned styrene polymers may be selected.

As one toner resin, there are selected the esterification products of a dicarboxylic acid and a diol comprising a diphenol. These resins are illustrated in U.S. Pat. No. 3,590,000, the disclosure of which is totally incorporated herein by reference. Other specific toner resins include styrene/methacrylate copolymers, and styrene/butadiene copolymers; PLIOLITES®; suspension polymerized styrene butadienes, reference U.S. Pat. No. 4,558,108, the disclosure of which is totally incorporated herein by reference; polyester resins obtained from the reaction of a bisphenol A and propylene oxide; followed by the reaction of the resulting product with fumaric acid, and branched polyester resins resulting from the reaction of dimethylterephthalate, 1,3-butanediol, 1,2-propanediol, and pentaerythritol, styrene acrylates, and mixtures thereof. Also, waxes with a molecular weight, $M_W$ of from about 1,000 to about 20,000, such as polyethylene, polypropylene, and paraffin waxes, can be included in, or on the toner compositions as fuser roll release agents. Also, it is preferred that the toner resin be the same as, or similar to the substrate coating.

The resin particles are present in a sufficient, but effective amount, for example from about 70 to about 90 weight percent. Thus, when 1 percent by weight of a charge enhancing additive is present, and 10 percent by weight of pigment or colorant, such as carbon black, is contained therein, about 89 percent by weight of resin is selected.

Numerous well known suitable colorants, such as pigments or dyes, can be selected as the colorant for the toner particles including, for example, carbon black, nigrosine dye, aniline blue, magnetite, or mixtures thereof. The colorant, which can be carbon black, cyan, magenta, yellow, red, green, blue, brown, pink, orange, mixtures thereof and the like should be present in a sufficient amount to render the toner composition colored. Generally, the colorant is present in amount of from about 1 percent by weight to about 20 percent by weight, and preferably from about 2 to about 10 weight percent based on the total weight of the toner composition; however, lesser or greater amounts can be selected. Illustrative examples of magenta include, for example, 2,9-dimethyl-substituted quinacridone and anthraquinone dye identified in the Color Index as Cl 60710, Cl Dispersed Red 15, diazo dye identified in the Color Index as Cl 26050, Cl solvent Red 19, and the like. Illustrative examples of cyans include copper tetra-4-(octadecyl sulfonamido) phthalocyanine, X-copper phthalocyanine pigment listed in the Color Index as Cl 74160, Cl Pigment Blue, and Anthrathrene Blue, identified in the Color Index as Cl 69810, Special Blue X-2137, and the like; while illustrative examples of yellows are diarylide yellow 3,3-dichlorobenzidene acetoacetanilides, a monoazo pigment identified in the Color Index as Cl 12700, Cl Solvent Yellow 16, a nitrophenyl amine sulfonamide identified in the Color Index as Foron Yellow SE/GLN, Cl Dispersed Yellow 33, 2,5-dimethoxy-4-sulfonanilide phenylazo-4'-chloro-2,5-dimethoxy acetoacetanilide, and Permanent Yellow FGL.

When the colorant particles are comprised of magnetites, thereby enabling single component toners in some instances, which magnetites are a mixture of iron oxides ($FeO.Fe_2O_3$) including those commercially available as MAPICO BLACK®, they are present in the toner composition in an amount of from about 120 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas such as those available from DeGussa Chemicals, AEROSIL®, metal salts and metal salts of fatty acids inclusive of zinc stearate, aluminum oxides, titanium oxides, titanates like stronium titanate, cerium oxides, and mixtures thereof, which additives are each generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

Moreover, there can be included in the toner compositions of the present invention low, such as from about 1,000 to about 20,000 $M_W$, molecular weight waxes, such as polypropylenes and polyethylenes commercially available from Allied Chemical and Petrolite Corporation, Epolene N-15 commercially available from Eastman Chemical Products, Inc., Viscol 550P, a low weight average molecular weight polypropylene available from Sanyo Kasei K.K., and similar materials. The commercially available polyethylenes selected have a molecular weight of from about 1,000 to about 1,500, while the commercially available polypropylenes utilized for the toner compositions of the present invention are believed to have a molecular weight of from about 4,000 to about 5,000. Many of the polyethylene and polypropylene compositions useful in the present invention are illustrated in British Patent No. 1,442,835, and U.S. Pat. No. 5,229,242, the disclosures of which are totally incorporated herein by reference.

The low molecular weight wax materials are present in the toner composition of the present invention in various amounts, however, generally these waxes are present in the toner composition in an amount of from about 1 percent by weight to about 15 percent by weight, and preferably in an amount of from about 2 percent by weight to about 10 percent by weight.

For the formulation of developer compositions, there are mixed with the toners carrier components, particularly those that are capable of triboelectrically assuming an opposite polarity to that of the toner composition. Accordingly, the carrier particles can be selected to be, for example, of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. Nos. 3,526,533 and 3,467,634, the disclosures of which are totally incorporated herein by reference; polymethyl methacrylates; other known coating; and the like. The carrier particles may also include in the coating, which coating can be present in one embodiment in an amount of from about 0.1 to about 3 weight percent, conductive substances, such as carbon black, in an amount of from about 5 to about 30 percent by weight. Polymer coatings not in close proximity in the triboelectric series can also be selected, reference U.S. Pat. No. 4,937,166 and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

The diameter of the carrier particles, preferably spherical in shape, is generally from about 50 microns to about 1,000, and more specifically, from about 75 to about 150 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 100 parts to about 200 parts by weight of carrier are selected.

Specific embodiments of the invention will now be described in detail. These Examples are intended to be illustrative, and the invention is not limited to the materials, conditions, or process parameters set forth in these embodiments. All parts and percentages are by weight unless otherwise indicated. Comparative Examples and data are also provided.

The variation in gloss level of a xerographic color print can be quantified by using a specially devised differential gloss test target. The test target consists of an 8 and ½ by 11 inch sheet having nine equally sized squares of 5 centimeter dimension evenly spaced around the area of the sheet. The nine squares have varying optical density which is achieved by varying the toner coverage on each square as follows: 0 percent coverage (substrate only), 10 percent coverage, 20 percent coverage, 40 percent coverage, 60 percent coverage, 80 percent coverage, 100 percent coverage, the color green (2 layers of toner) and process black (3 layers of toner). A print of this test target is then produced on a xerographic color copier/printer using a given substrate. The gloss level of the nine squares on the resulting xerographic print is measured using a 75° Glossmeter. The variation in gloss level is then defined as the difference in gloss between the highest and lowest gloss values obtained from the nine squares of varying toner coverage.

The Xerox Corporation 5790 toner set used in the following Examples was comprised of a terephthalic acid, bisphenol-A-ethylene adduct, cyclohexane dimethanol polyester resin, and each of the toners had the following compositions. The cyan toner was composed of 95.5 percent (by weight throughout) of the polyester resin and 4.5 percent of C. I. Pigment Blue 15:3; the magenta toner was composed of 94 percent of the polyester resin and 6 percent of C.I. Pigment Red 57:1; the yellow toner was composed of 92.8 percent of the polyester resin and 7.2 percent of C.I. Pigment Yellow 17; and the black toner was composed of 94 percent of the polyester resin and 6 percent of carbon black #25B from the Mitsubishi Kasei Corporation.

COMPARATIVE EXAMPLE I

A print of the differential gloss test target was produced on a Xerox 5790 color copier using Xerox Image LX plain paper with no polymer, such as a polyester coating, as the substrate. The gloss level of the nine squares, with varying degrees of toner coverage, were then measured using a 75° Glossmeter and the values recorded. The highest gloss level of 85 GU was obtained from the process black square and the lowest gloss level of 10 GU from the 0 percent toner coverage square. Therefore, this print exhibits a variation in gloss of 75 GU (85-10 GU). Potentially, any photographic original printed on a xerographic color copier using plain paper could exhibit this level of gloss variation which is highly visible to the eye thus making the print unlike the photographic original.

COMPARATIVE EXAMPLE II

A print of the differential gloss test target was produced on a Xerox 5790 color copier using Warren Lustro Gloss paper (a typical commercially available coated paper stock) as the substrate. The gloss level of the nine squares, with varying degrees of toner coverage, were then measured using a 75° Glossmeter and the values recorded. The highest gloss level of 90 GU was obtained from the process black square and the lowest gloss level of 45 GU was obtained from the 80 percent toner coverage square. Therefore, this print exhibits a variation in gloss of 45 GU (90-45 GU). Potentially any photographic original printed on a xerographic color copier using currently available coated paper stocks could exhibit this level of gloss variation, which is highly visible to the eye, thus making the print unlike the photographic original.

EXAMPLE III

An 8 and ½ by 11 inch, 152 micron thick sheet of coated ink jet paper, available from the Asahi Glass Company, was coated with a 5 micron thick layer of a polyester resin comprised of terephthalic acid, bisphenol-A-ethylene oxide adduct, cyclohexane dimethanol, (Xerox Corporation $Fe_2O_8$ polyester). The polyester coating was applied to one side of the paper from a 25 percent solution of the polyester resin the methylene chloride using a #8, draw-down rod. The polyester coating was air dried and a print of the differential gloss test target was produced on a Xerox 5790 color copier using the resulting polyester coated paper. A print of the same test target was also produced on a sheet of Asahi Gloss paper without the polyester top coating. The gloss level of the nine squares on both prints was measured using a 75° Glossmeter and the values recorded. A variation in gloss of 42 GU was obtained for the Asahi Gloss paper without the polyester top coating whereas a significant lower variation in gloss of 20 GU was obtained from the polyester coated paper. A print of a photographic original produced on the polyester coated paper appeared more photographic like than a print produced on the uncoated paper because of the lower variation in gloss, and improved gloss uniformity.

EXAMPLE IV

A roll of commercially available coated offset paper, Kromekote 100 pound Enamel, was obtained from the Champion Paper Company. This paper is manufactured with Champion's coating on both sides and has a total thickness of 150 microns. The roll of paper was coated on one side with a layer of low molecular weight, branched copolyester resin formed from isophthalic and nonanedioic acid with diols and triols, and Vitel 5833B, a polyester with an $M_n$ of 4,600, and an $M_W$ of 9,800, and obtained from the Bostik Company. The copolyester resin was applied from a 25 percent solution in ethyl acetate using a pilot scale Faustel Coater. Approximately 500 feet of paper were coated with the copolyester resin and the thickness of the resin layer was increased by 2 microns every 100 feet starting with a thickness of 2 microns and ending with a thickness of 10 microns. The polyester layer was air dried and prints of the differential gloss test target were produced on a Xerox 5790 color copier using this set of polyester coated papers where the thickness of the polyester layer had been varied. Measurements of the gloss variation and curl were made on the resulting prints. It was found that a thickness of 6 to 8 microns for the polyester layer provided the optimum combination of uniform high gloss and low curl.

Approximately 1,000 feet of the Kromekote 100 pound Enamel paper were subsequently coated with the optimum polyester coating Vitel 5833B thickness of 7 microns. A print of the differential gloss test target was produced on a Xerox 5790 color copier using the resulting polyester coated paper. A print of the same test target was also produced on a sheet of Kromekote 100 pound Enamel paper without the polyester top coating. The gloss level of the nine squares on both prints was measured using a 75° Glossmeter and the values recorded. For the Kromekote paper without the polyester layer, the highest gloss level of 100 GU was obtained from the process black square and the lowest gloss level of 48 GU was obtained from the 40 percent toner coverage square resulting in a significant variation in gloss of 52 GU (100-48 GU). For the Kromekote paper with the optimum polyester coating thickness, there was provided the highest gloss level of 100 GU from the process black square and the lowest gloss level of 88 GU from the 100 percent toner covering square resulting in a significantly lower variation in gloss of 12 GU (100-88 GU). A print of a phototropic original produced on the polyester coated Kromekote paper appeared more photographic like than a print produced on the uncoated paper because of the improvement in gloss uniformity.

There were generated cross-sectional micrographs of the prints on the above uncoated and coated Kromekote papers. These micrographs showed that with the uncoated Kromekote paper the fused toner still remained above the surface of the paper resulting in a wide variation in gloss from 100 GU to 48 GU which was highly dependent on the degree of toner coverage. The fused toner on the polyester coated sample had sunk, or dispersed into the polyester layer, away from the surface of the paper, resulting in a much more uniform gloss across the print which was less dependent on the degree of toner coverage. The toner particles are able to sink into the polyester coating on the paper because the resin that is used for the polyester coating was selected so that it would have a lower melt viscosity than the toner resin at the fusing temperature encountered in the color copier.

EXAMPLE V

A roll of commercially available coated offset paper Kromekote 6 PT cover, was obtained from the Champion Paper Company. This paper was manufactured with Champion's coating on only one side of the paper and has a total thickness of 150 microns. The roll of paper was coated on the Champion coated side with a 6.5 micron thick layer of a low molecular weight, branched copolyester, Vitel 5833B. The copolyester resin was applied from a 25 percent solution in ethyl acetate using a pilot scale Faustel Coater. A print of the differential gloss test target was produced on a Xerox 5790 color copier using the resulting polyester coated paper. A print of the same target was also produced on a sheet of Kromekote 6 PT cover paper without the polyester coating. The gloss level of the nine squares on both prints was measured using a 75° Glossmeter and the values recorded. For the paper without the polyester coating, the highest gloss level of 99 GU was obtained from the green square (2 layers of toner) and the lowest gloss of 51 GU from the 40 percent toner coverage square resulting in a significant variation in gloss of 48 GU (99-51 GU). On the other hand, the polyester coated paper gave the highest gloss level of 98 GU from the process black square and the lowest gloss of 85 GU from the 10 percent toner coverage square resulting in a significantly lower variation in gloss of 13 GU (98-85 GU). A print of a photographic original produced on the polyester coated paper appeared more photographic like because of the improvement in gloss uniformity.

EXAMPLE VI

A roll of commercially available coated offset paper, Reflection II Gloss, was obtained from Consolidated Papers Inc. This paper was manufactured with the Consolidated coating on both sides and has a total thickness of 191 microns. The roll of paper was coated with a 7.0 micron thick layer of a low molecular weight branched copolyester, Vitel 5833B. The polyester resin was applied from a 25 percent solution in ethyl acetate using a pilot scale Faustel Coater. A print of the differential gloss test target was produced on a Xerox 5790 color copier using the resulting polyester coated paper. A print of the same test target was also produced on a sheet of Reflection II Gloss paper without the polyester coating. The gloss level of the nine squares on both prints was measured using a 75° Glossmeter and the values recorded. For the paper without the polyester coating, the highest gloss level of 92 GU was obtained from the process black square and the lowest gloss level of 50 GU from the 60 percent toner coverage square resulting in a significant variation in gloss of 42 GU (92-50 GU). In contrast, the polyester coated paper provided the highest gloss level of 99 GU from the 0 percent coverage square and the lowest gloss of 88 GU from the 100 percent coverage square resulting in a significantly lower variation in gloss of 11 GU (99-88 GU). A print of a photographic original produced on the polyester coated paper prepared more photographic like because of the improvement in gloss uniformity, and also because the thickness of this base paper more closely matches that of typical photographic papers.

EXAMPLE VII

A roll of commercially available coated offset paper, Centura Gloss, was obtained from Consolidated Papers Inc. This paper was manufactured with Consolidated coating on both sides and has a total thickness of 142 microns. The roll of paper was coated with a 6.5 micron thick layer of a low molecular weight, branched copolyester resin, Vitel 5833B. The resin was applied from a 25 percent solution in ethyl acetate using a pilot scale Faustel Coater. A print of the differential gloss test target was produced on a Xerox 5790 color copier using the resulting polyester coated paper. A print of the same test target was also produced on a sheet of Centura Gloss paper without the polyester coating. The gloss level of the nine squares on both papers was measured using a 75° Glossmeter and the values recorded. For the paper without the polyester coating, the highest gloss level of 90 GU was obtained from the process black square and the lowest gloss level of 57 GU from the 40 percent toner coverage square resulting in a significant variation in gloss of 33 GU (90-57 GU). In contrast, the invention polyester coated paper provided the highest gloss level of 96 GU from the 10 percent coverage square and the lowest gloss level of 90 GU from the green square resulting in a significantly lower variation in gloss of 6 GU (96-90 GU). A print of a photographic original produced on the polyester coated paper appeared more photographic like because of the improvement in gloss uniformity.

Other embodiments and modifications of the present invention may occur to those skilled in the art subsequent to a review of the information presented herein; these embodiments and modifications, as well as equivalents thereof, are also included within the scope of this invention.

What is claimed is:

1. A photopaper comprising:

a substrate; and a thin polyester coating over the substrate, wherein the photopaper enables the generation of toner images with a substantially uniform gloss throughout the images on the coating.

2. The photopaper of claim 1, wherein the substrate comprises a cellulosic material.

3. The photopaper of claim 1, wherein the coating has a thickness of about 1 micron to about 15 microns.

4. The photopaper of claim 3, wherein the images have a gloss value between about 50 GU to about 100 GU as measured by a 75° Glossmeter.

5. The photopaper of claim 3, further comprising toner embedded below an outer surface of the coating.

6. The photopaper of claim 1, wherein the images have a gloss value between about 50 GU to about 100 GU.

7. The photopaper of claim 1, further comprising a toner image formed on the coating.

8. The photopaper of claim 7, wherein the coating has a thickness of about 1 micron to about 15 microns.

9. The photopaper of claim 8, wherein the image has a gloss value between about 50 GU to about 100 GU as measured by a 75° Glossmeter.

10. The photopaper of claim 7, wherein the image has a gloss value between about 50 GU to about 100 GU as measured by a 75° Glossmeter.

11. The photopaper of claim 7, wherein the images are developed on the photopaper with a toner comprising a resin, and the polyester has a lower melt viscosity than the resin at temperatures sufficient to fuse the image.

12. The photopaper of claim 11, wherein the coating has a thickness of about 1 micron to about 15 microns.

13. The photopaper of claim 12, wherein the image has a gloss value between about 50 GU to about 100 GU as measured by a 75° Glossmeter.

14. The photopaper of claim 11, wherein the image has a gloss value between about 50 GU to about 100 GU as measured by a 75° Glossmeter.

15. The photopaper of claim 1, further comprising toner embedded below an outer surface of the coating.

16. A process comprising:

providing a photopaper according to claim 1;

forming an image on the polyester coating;

developing the image with toner; and applying only heat and pressure to the developed image to form an image having a substantially uniform gloss throughout the image on the substrate.

17. The process of claim 16, wherein the coating has a thickness of about 2 micron to about 15 microns.

18. The process of claim 16, wherein the image has a gloss value between about 50 GU to about 100 GU as measured by a 75° Glossmeter.

19. The process of claim 16, wherein the toner comprises a resin, and the polyester has a lower melt viscosity than the resin at temperatures sufficient to fuse the image.

20. The process of claim 16, wherein:

the image is a latent image electrostatically formed on an imaging member;

the latent image is developed with the toner; and the developed image is transferred to the substrate.

21. The process of claim 16, wherein the image is formed and developed on the substrate.

22. The process of claim 16, wherein the toner is absorbed into the coating.

23. A process comprising:

providing a photopaper according to claim 1;

forming an image on the polyester coating;

developing the image with toner; and applying only heat and pressure to the substrate to sink the toner below a surface of the polyester coating:

wherein the image has a substantially uniform gloss throughout the image; and a high gloss value.

24. The process of claim 23, wherein the polyester coating has a thickness of about 1 micron to about 15 microns.

25. The process of claim 23, wherein the image has a gloss value between about 50 GU to about 100 GU as measured by a 75° Glossmeter.

26. An electrostatic process comprising:

providing a photopaper according to claim 1;

electrostatically forming an image on the polyester coating;

subsequently developing the image and applying only heat and pressure to the substrate to absorb toner into the polyester coating;

wherein the image has a substantially uniform gloss throughout the image and a high gloss value.

27. The process of claim 26, wherein the polyester coating has a thickness of about 1 micron to about 15 microns.

28. The process of claim 26, wherein the image has a gloss value between about 50 GU to about 100 GU as measured by a 75° Glossmeter.

29. A process comprising:

providing a photopaper according to claim 1;

forming an image on the polyester coating;

developing the image with toner;

heating the polyester coating; and absorbing the toner into the heated polyester coating without applying an electric field to the toner;

wherein the image has a substantially uniform gloss throughout the image and a high gloss value.

30. The process of claim 29, wherein the polyester coating has a thickness of about 1 micron to about 15 microns.

31. The process of claim 29, wherein the image has a gloss value between about 50 GU to about 100 GU as measured by a 75° Glossmeter.

32. A photopaper comprising:

a substrate; and a thin polyester coating over the substrate, wherein the photopaper enables the generation of toner images with a gloss similar to silver halide photos on the coating.

33. A photopaper comprising:

a substrate; and a polymer coating over the substrate, the coating having an outer surface;

wherein a toner is embedded in the polymer coating below the surface to form an image having a uniform gloss.

34. The photopaper of claim 33, wherein the polymer coating is formed directly on the substrate, and the photopaper consists essentially of the substrate and polymer coating.

35. A photopaper comprising:

a substrate; and a polyester coating over the substrate, the polyester coating having an outer surface and a thickness of about 1 micron to about 15 microns;

wherein a toner is embedded in the polyester coating below the outer surface to form an image, the image has a gloss value between about 50 GU to about 100 GU as measured by a 75° Glossmeter, and the gloss of the image is substantially uniform throughout the image.

36. The photopaper of claim 35, wherein the polyester coating is formed directly on the substrate, and the photopaper consists essentially of the substrate and polyester coating.

37. A photopaper comprising:

a substrate; and a polyester coating over the substrate, the polyester coating having an outer surface;

wherein a toner is embedded in the coating below the outer surface to form an image, the toner comprises a resin and the polyester has a lower melt viscosity than the resin at temperatures sufficient to fuse the image, and the image has a gloss that is substantially uniform throughout the image.

38. The photopaper of claim 37, wherein the polyester coating is formed directly on the substrate, and the photopaper consists essentially of the substrate and polyester coating.

39. A photopaper comprising:

a substrate; and a polyester coating over the substrate, the polyester coating having an outer surface;

wherein a toner is embedded in the coating below the outer surface by applying heat and pressure to the polyester coating to form an image, the toner comprises a resin and the polyester has a lower melt viscosity than the resin at temperatures sufficient to fuse the image, and the image has a gloss that is substantially uniform throughout the image.

40. The photopaper of claim 39, wherein the polyester coating is formed directly on the substrate, and the photopaper consists essentially of the substrate and polyester coating.

* * * * *

UNITED STATES PATENT AND TRADEMARK OFFICE

CERTIFICATE OF CORRECTION

PATENT NO. : 6,326,085 B1

DATED : December 4, 2001

INVENTOR(S) : T. Brian McAneney, Edward G. Zwartz, Kirit N. Naik, Fernando P. Yulo, Sandra J. Gardner, James H. Sharp and Shadi L. Malhotra It is certified that error appears in the above-identified patent and that said Letters Patent is hereby corrected as shown below:

Title page,
Item [56], "References Cited", after
"05104868 4/1993 (JP)."
insert:

-- OTHER PUBLICATIONS

Database WPI - Derwent Publications Ltd., London, GB, Class A89, AN 93-306104, XP002103654 & JP 05 216322 A (Konica Corp), August 27, 1993 - Abstract Database WPI - Derwent Publications Ltd., London, GB Class A97, AN 93-071812, XP002103655 & JP 05 019522 A (Sanken Kato KK), January 29, 1993 - Abstract --

Signed and Sealed this

Thirtieth Day of July, 2002

*Attest:*

JAMES E. ROGAN

*Attesting Officer* *Director of the United States Patent and Trademark Office*